S. F. DOLLOFF.
Improvement in Churn-Dashers.

No. 115,177.  Patented May 23, 1871.

Witnesses.  Inventor.
Samuel F. Dolloff
per
Alexander Mason
attys.

UNITED STATES PATENT OFFICE.

SAMUEL F. DOLLOFF, OF BLOOMINGTON, ILLINOIS.

IMPROVEMENT IN CHURN-DASHERS.

Specification forming part of Letters Patent No. 115,177, dated May 23, 1871.

*To all whom it may concern:*

Be it known that I, SAMUEL F. DOLLOFF, of Bloomington, in the county of McLean and in the State of Illinois, have invented certain new and useful Improvements in Combined Churn-Dasher and Cream-Breaker; and do hereby declare that the following is a full, clear, and exact description thereof, reference being had to the accompanying drawing and to the letters of reference marked thereon making a part of this specification.

The nature of my invention consists in the construction and arrangement of a "combined churn-dasher and cream-breaker," as will be hereinafter fully set forth.

In order to enable others skilled in the art to which my invention appertains to make and use the same, I will now proceed to describe its construction and operation, referring to the annexed drawing, in which—

Figure 1:
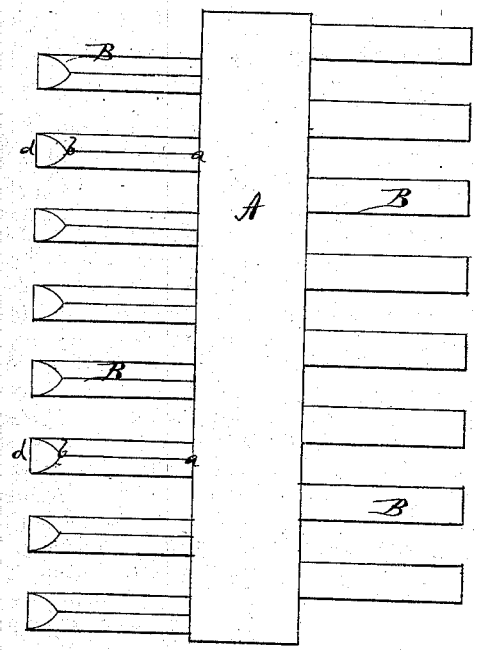
Figure 2:
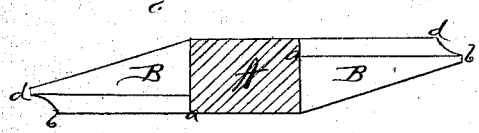
Figure 3:
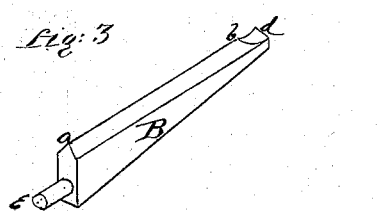

Figure 1 is a side view of the dasher. Fig. 2 is a cross-section of the same, and Fig. 3 is a perspective view of one of the arms.

A represents the center shaft, which is square, and should be provided with journals so as to revolve within the churn. The shaft A is provided on two sides with arms B B, which are placed so that each arm on one side is directly opposite the space between the two arms on the other side. These arms are straight, and on the front side are beveled to within a short distance of their ends from $a$ to $b$, and then flattened diagonally from $b$ to $d$, said flattened portion being either concave, as shown, or plane, if so desired. This is done to more effectually shock and disturb the cream that lies just beyond the arms, and also to give the cream a rotary motion toward the center of the churn and bring the cream that lies beyond their reach directly under their action. The backs of the arms B B are made diagonal from the edge of the shaft to the point $d$ and flattened, in order that the butter may be easily gathered by reversing the action of the dash, and made diagonal in order that the butter may not be carried around with the dash. The arms B B are attached to the shaft A by means of tenons $e$ $e$, or in any other suitable and convenient manner.

Having thus fully described my invention, what I claim as new, and desire to secure by Letters Patent, is—

A churn-dasher and cream-breaker, composed of the shaft A and arms B B, said arms being flat and diagonal on their rear sides, and the front sides beveled from $a$ to $b$ and from $b$ to the outer end flattened diagonally either plane or concave, substantially as and for the purposes herein set forth.

In testimony that I claim the foregoing I have hereunto set my hand this 17th day of September, 1870.

SAMUEL F. DOLLOFF.

Witnesses:
 THOS. SLADE,
 N. T. PUSEY.